United States Patent [19]

Hirane et al.

[11] Patent Number: 4,962,375
[45] Date of Patent: Oct. 9, 1990

[54] DRIVING CIRCUIT FOR A LIGHT EMITTING DIODE ARRAY

[75] Inventors: Hideo Hirane, Hitachi; Kiyohiko Tanno, Katsuta; Kentaro Yagi, Ichikawa; Hisao Iitsuka, Hitachi, all of Japan

[73] Assignees: Hitachi, Ltd.; Seiko Instruments Inc.; Hitachi Cable, Ltd., Tokyo, Japan

[21] Appl. No.: 172,634

[22] Filed: Mar. 24, 1988

[30] Foreign Application Priority Data

Mar. 27, 1987 [JP] Japan .................. 62-71468

[51] Int. Cl.⁵ .............................. G09G 3/32
[52] U.S. Cl. .................... 340/782; 340/762; 340/767; 346/107 R
[58] Field of Search ............. 340/719, 762, 782, 811, 340/815.03, 767; 346/160, 107 R, 108; 355/70; 358/298

[56] References Cited

U.S. PATENT DOCUMENTS

| | | | |
|---|---|---|---|
| 4,427,275 | 1/1984 | Stalzer | 346/107 R |
| 4,435,064 | 3/1984 | Tsukada et al. | 346/107 R |
| 4,536,778 | 8/1985 | De Schamphelaere et al. | 346/107 R |
| 4,571,602 | 2/1986 | De Schamphelaere et al. | |
| 4,682,162 | 7/1989 | Holloman | 340/719 |
| 4,689,618 | 8/1987 | Hikichi | 340/762 |
| 4,689,694 | 8/1987 | Yoshida | 346/108 |
| 4,734,714 | 3/1988 | Takasu et al. | 346/107 R |
| 4,750,010 | 6/1988 | Ayers et al. | 346/107 R |

FOREIGN PATENT DOCUMENTS

| | | |
|---|---|---|
| 0260574 | 3/1988 | European Pat. Off. |
| 57-10279 | 1/1982 | Japan . |
| 61-115359 | 2/1986 | Japan . |
| 61-150286 | 7/1986 | Japan . |
| 2104266 | 3/1983 | United Kingdom . |

Primary Examiner—Alvin Oberley
Assistant Examiner—M. Fatahiyar
Attorney, Agent, or Firm—Kenyon & Kenyon

[57] ABSTRACT

A driving circuit for a light emitting diode array, which is divided into a plurality of drivers for every driving output and so constructed that the control of the sum of the currents flowing therethrough is set by selecting one or a plurality of the divided drivers by using digital signals "1" and "0".

11 Claims, 5 Drawing Sheets

DRIVING CIRCUIT FOR A LIGHT EMITTING DIODE ARRAY BACKGROUND OF THE INVENTION

This invention relates to a driving circuit for a light emitting diode array used as a recording light source e.g. for an electronic photographic type printer, and in particular to a driving circuit for a light emitting diode array, which is suitable for controlling the intensity of the driving current in a multistage manner.

A number of prior art driving circuits for light emitting diode arrays are constructed, as indicated in FIG. 5 (e.g. "Development of LED array printing head", Research and Development of Oki Electric Industry Co., Ltd., Vol. 52, No. 1) In FIG. 5, reference numeral 1 represents a driver IC including a driving circuit; $LED_1$–$LED_N$ a light emitting diode array; and R a current limiting resistor. The driving current of the light emitting diodes is controlled to a constant value by inserting limiting resistors R having a constant resistance in series in their current supplying circuits. The prior art driver IC 1 used therefor works as described below.

DI of the driver IC 1 is the data input terminal of a shift register SR and CLK thereof is the shift clock terminal. Image data are taken successively from the DI to the shift register by the shift clock. LATCH is a latch circuit, which holds temporarily the image data taken in the shift register, and it is driven by an input signal latch strobe from a terminal LST. DST is an input terminal for enabling drivers $D_1$–$D_N$ and the driver strobe signal therefrom opens gates G, which makes drivers conductive, when the output data of the LATCH are "1". $Q_1$, $Q_2$,—, $Q_N$ represent output terminals of the drivers. They form thus a current supplying circuit for the light emitting diode array through limitting resistors R. The current flowing through each of the light emitting diodes is a constant current, which is equal to $$\frac{E - V_F}{R},$$

depending on the voltage E of the power source and the voltage drop $V_F$ of each of the light emitting diodes in the forward direction. DO indicates the serial output terminal of the shift register. Since a light emitting diode array print head consists usually of several thousands of elements, a plurality of driver ICs are used, connected in series. The serial output terminal DO is disposed for transmitting the image data to the succeeding driver IC. JP-A-61-115359, JP-A-61-150286, JP-A-57-10279, etc. can be cited as examples of this type of circuits.

Light emitting diode arrays are formed on a wafer by semiconductor techniques. Since fluctuations in the light out of the light emitting diode arrays on the whole wafer are great, usually portions, where fluctuations are small, are cut-out and used as chips. Although fluctuations in the light output of a light emitting diode array print head obtained by arranging such chips becomes small, fluctuations in the light output in unit of an element and those in unit of a chip are not completely removed. Consequently there was a problem that an electronic photographic image by means of such a print head driven by a constant current contains fluctuations in the density, which deteriorate the image quality.

Further the light output of the light emitting diodes can be subjected to changes with the passage of time. As the result the electronic photographic image can become deeper or lighter with the lapse of time. For this reason it is necessary to change the driving current over the course of time. Since the output current cannot be controlled in the prior art driver IC chip, it is obliged to deal therewith by changing limiting resistors. Since the limiting resistors are formed on the substrate for the print head, on which the chip is mounted, it is difficult to work them in order to reset their resistance. Therefore it is another problem of the prior art techniques that it is not possible to deal with the changes with the passage of time.

SUMMARY OF THE INVENTION

In view of these situations, the object of this invention is to provide a driving circuit capable of eliminating the deterioration in the image quality due to fluctuations in the light output and changes with the passage of time.

In order to resolve the problems stated above of the prior art techniques, the present invention provides a construction of driver IC in which driving means are divided into a plurality of drivers for every output thereof so as to be able to control their output current. The circuit is provided with input terminals, by means of which the control for selecting one or a plurality of the divided drivers can be set by using digital signals "1" and "0".

The driving circuit for a light emitting diode array according to this invention can be so controlled that the driving current is increased for a light emitting diode array having a small light output and it is decreased for that having a great light output. In this way the light emitting diode array can have almost uniform light intensity and it is possible to eliminate fluctuations in the light output. Further it is possible also to deal easily with changes of the light output with the passage of time by reinputting digital signals.

DETAILED DESCRIPTION OF THE PRESENT INVENTION

Figure 1:
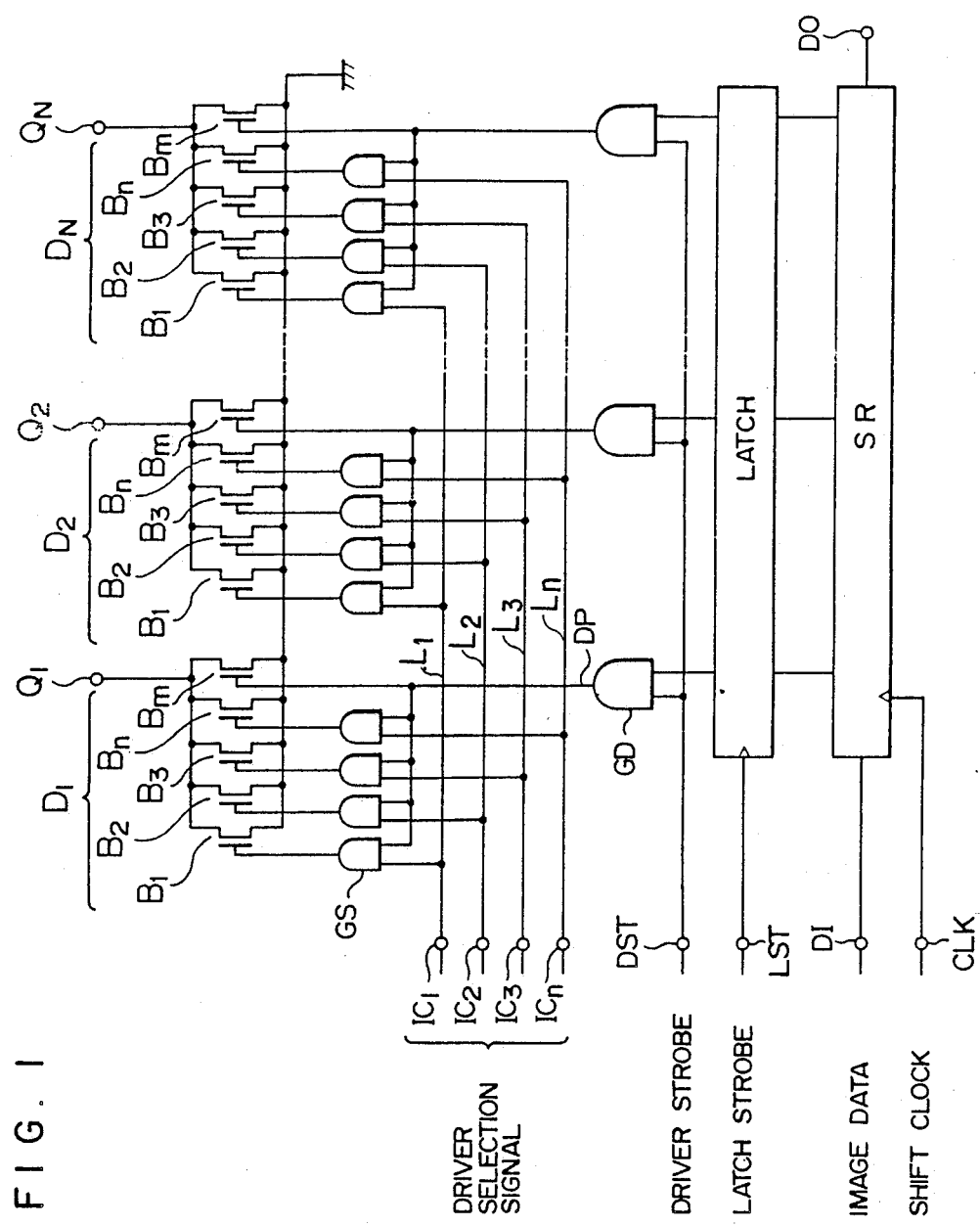
FIGS. 1, 3 and 4 illustrate a construction of a driver, IC according to three different embodiments of the present invention.

Hereinbelow some preferred embodiments of this invention will be explained more in detail, referring to the drawings. FIG. 1 illustrates a first embodiment of the driver IC which is a driving circuit according to this invention.

Figure 2:
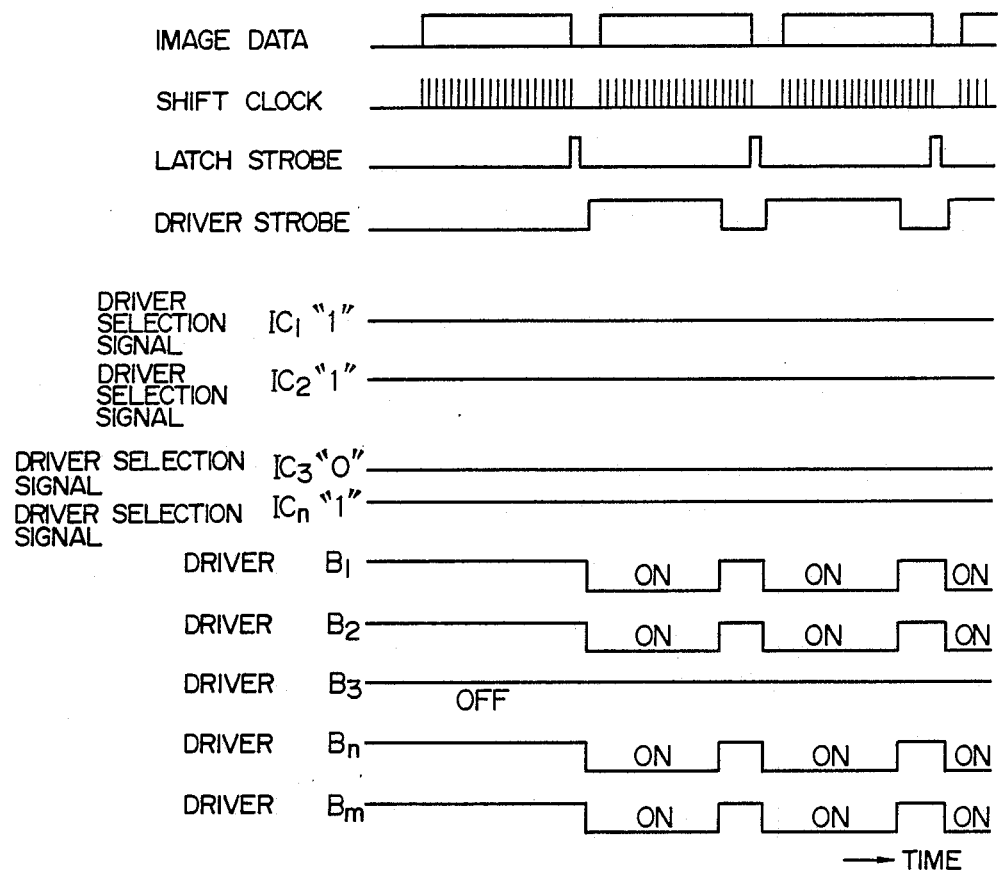
FIG. 2 is a timing chart for explaining the operation according to the present invention.
Figure 5:
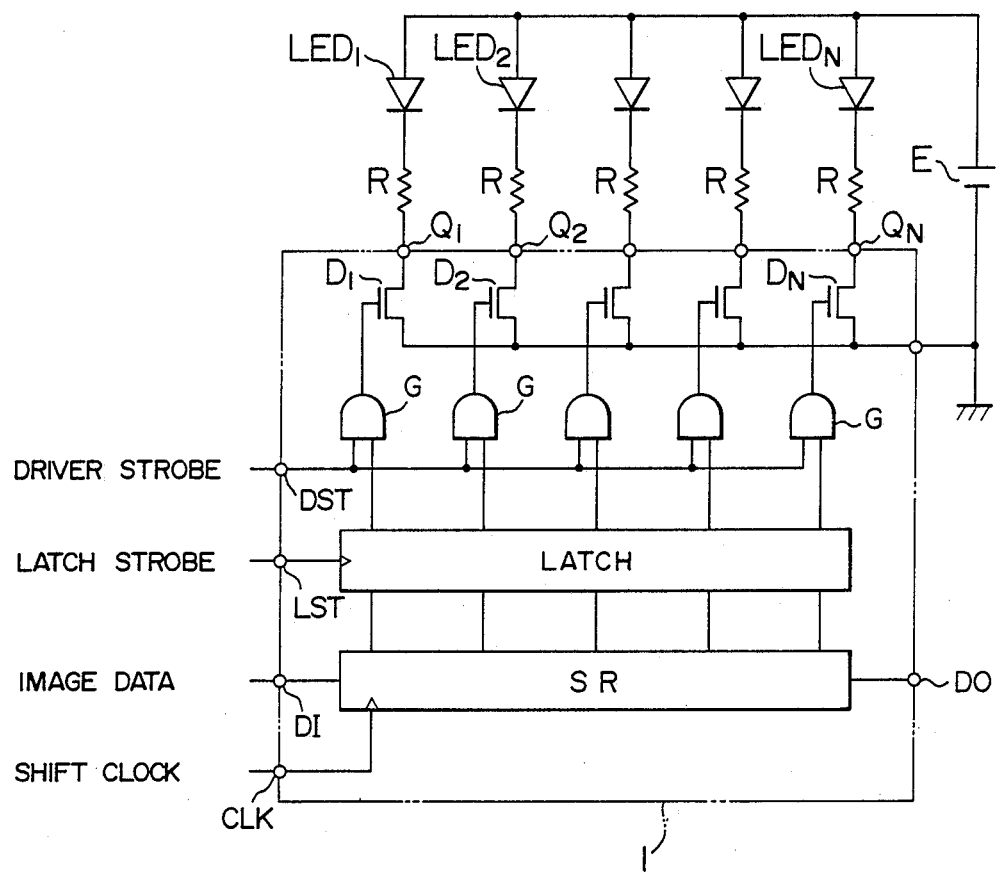
FIG. 5 shows an example of a prior art driving circuit for a light emitting diode array.

It is provided, as input terminals with an image data input terminal DI to a shift register SR, a shift clock input terminal CLK therefor, a latch strobe input terminal LST to a latch circuit LATCH, a driver strobe input terminal DST to drivers $D_1$–$D_N$, and driver selection signal input terminals $IC_1$–$IC_n$ for selecting divided drivers $B_1$–$B_n$. The signal input terminals $IC_1$–$IC_n$ are connected to the signal supplying lines $L_1$ to $L_n$. DO indicates data output terminals for connecting the succeeding driver IC therewith. $Q_1$–$Q_N$ are output terminals of the driver IC. These output terminals $Q_1$–$Q_N$ are connected with a light emitting diode array similar to that illustrated in the prior art circuit indicated in FIG. 5. FIG. 2 indicates a working timing for this driver IC. Sequential image data are taken in the shift register in synchronism with the shift clock. At the point of time, when the image data are stored in the predetermined position in the shift register, the latch strobe is inputted and the data are held in the latch circuit. This holding continues until the moment, when the succeeding latch strobe is inputted. When the first image data are moved to the latch circuit, the shift register is again in the working state and succeeding data are taken-in. Thereafter this operation is repeated and an image data scanning, for which waiting time is short, can be obtained.

Since the output of the latch circuit is inputted in gates GD, during a period of time, where the driver strobe is given, the image data pass through the gates and determine whether the driver is conductive or non-conductive. That is, the light emitting diode array is lit according to the image data.

Each of the drivers $D_1$-$D_N$ consists of m divided drivers B, $B_2$,—$B_m$ connected in parallel for each of the light emitting diode elements. They are so constructed that n (n=m−1) divided driver $B_1$-$B_n$ are switching-controlled by gates GS which form a logical product of the driver selection signal with the output image data $D_P$ and that the last divided driver $B_m$ is switching-controlled directly by the output image data $D_P$.

Consider now the case where the image data $D_P$ are "1" and the light emitting diode array is in the conductive state. The divided driver $B_m$ is always in the conductive state and a constant current $I_0$ flows therethrough. Since which of the divided drivers $B_1$-$B_n$ are used is selected by the driver selection signal, the sum of the currents flowing therethrough can have either one of $2^n$ values. As the result the current flowing out through the output $Q_1$, $Q^2$ or $Q^N$ consists of a minimum value given by the divided driver $B_m$ and a variable portion given by the divided drivers $B_1$-$B_n$.

When the values of the currents flowing through the divided drivers $B_1$, $B_2$, $B_3$,—$B_n$ are so set that they are proportional to 2 to the power of increasing integers starting from zero, i.e. I, $2^1 \cdot I$, $2^2 \cdot I$,—$2^{n-1} \cdot I$, by varying the size of their electrode, it is possible to realize the output current corresponding to the variable portion controlled by the driver selection signal, which varies stepwise such as O, I, 2I, 3I,-$(2^n-1)I$. Consequently the output current can be determined so as to have either one of $I_0$, $I_0+I$, $I_0+2I$, $I_0+3I$,—$I_0+(2^n-1)I$. The divided drivers $B_1$-$B_n$ are so connected that all of those having a same number are controlled by a driver selection signal and therefore, in one chip there are n input terminals for the signals.

The control region and the width of the step for the output current are determined by the light output-flowing current characteristics of the light emitting diode array. Depending on the characteristics, the values of the currents flowing through the divided driver $B_1$-$B_n$ are not restricted to the variables proportional to 2 to the power of integers described above, but they can vary according to one of other exponential forms or combinations thereof.

Since the output current control circuit is constructed by a logic circuit as described above, the driver selection signal is a digital signal. Concretely it is sufficient to connect the input terminals with a $V_{DD}$ terminal or a ground terminal through jumper means such as wire bonding, etc. In this way it is easy to supply a driver selection signal to driver IC so that when a light emitting diode array having a small light output is connected with this driver chip, the sum of the currents flowing through the divided drivers is great, while it is small, when the light output is great. It can be necessary to reset a driver selection signal, which has been once set, based on changes of the light emitting diode array with the passage of time. Since the driver selection signal is determined by using jumpers made of fine wire, it is easy to remove and modify them.

According to this embodiment, since it is possible to control the output current in a multi stage manner and the setting can be effected easily, fluctuations in the light output of the light emitting diode array are removed and it is possible to obtain an electronic photographic image of high image quality without fluctuations in the density. Further, since changes in the light output with passage of time can be compensated by corrections by means of resetting the current, an effect can be obtained that a constant high image quality is maintained.

Figure 3:
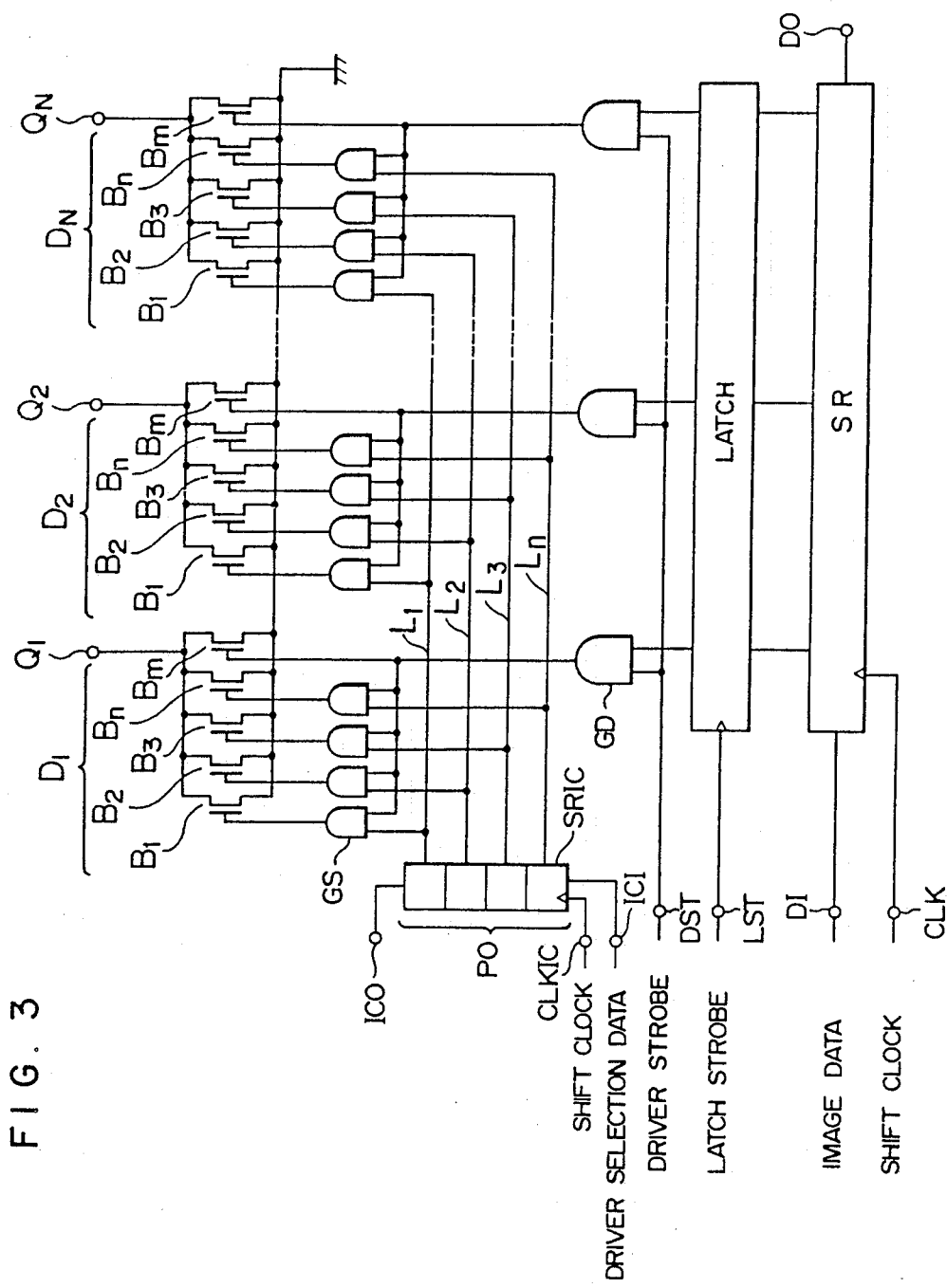

FIG. 3 illustrates a second embodiment of this invention, by which the output current control is effected on-line.

In FIG. 3, the construction so far as the output of the gates GD and the operation of the image data scanning are completely identical to those described for the first embodiment. In this embodiment, for the n-bit driver selection signal, a shift register SRIC consisting of the same number of bits is built-in. The shift register SRIC is connected to the signal supplying lines $L_1$-$L_n$. Driver selection data previously prepared on the basis of the light output characteristics of the light emitting diode array connected therewith are inputted in the shift register through an input terminal ICI from a read-only-memory (not shown in the figure), etc. where they are stored. An output terminal ICO of the shift register is used as a transmission path for the driver selection data, when a plurality of the driver ICs are used, connected in series. The input in the shift register SRIC may be effected usually only once before the image data are scanned or in synchronism with the scanning of the image data. Parallel outputs PO of the shift register are connected with the gates GS and work so that the driver selection data select the divided drivers $B_1$-$B_n$. Consequently, since the output current can be controlled just as in the first embodiment, an effect can be achieved that an electronic photographic image is obtained without fluctuations in the density. Furthermore, in this embodiment, since the output current control is effected only by the data input operation in the shift register, the resetting can be effected on-line without stopping the main system.

Figure 4:
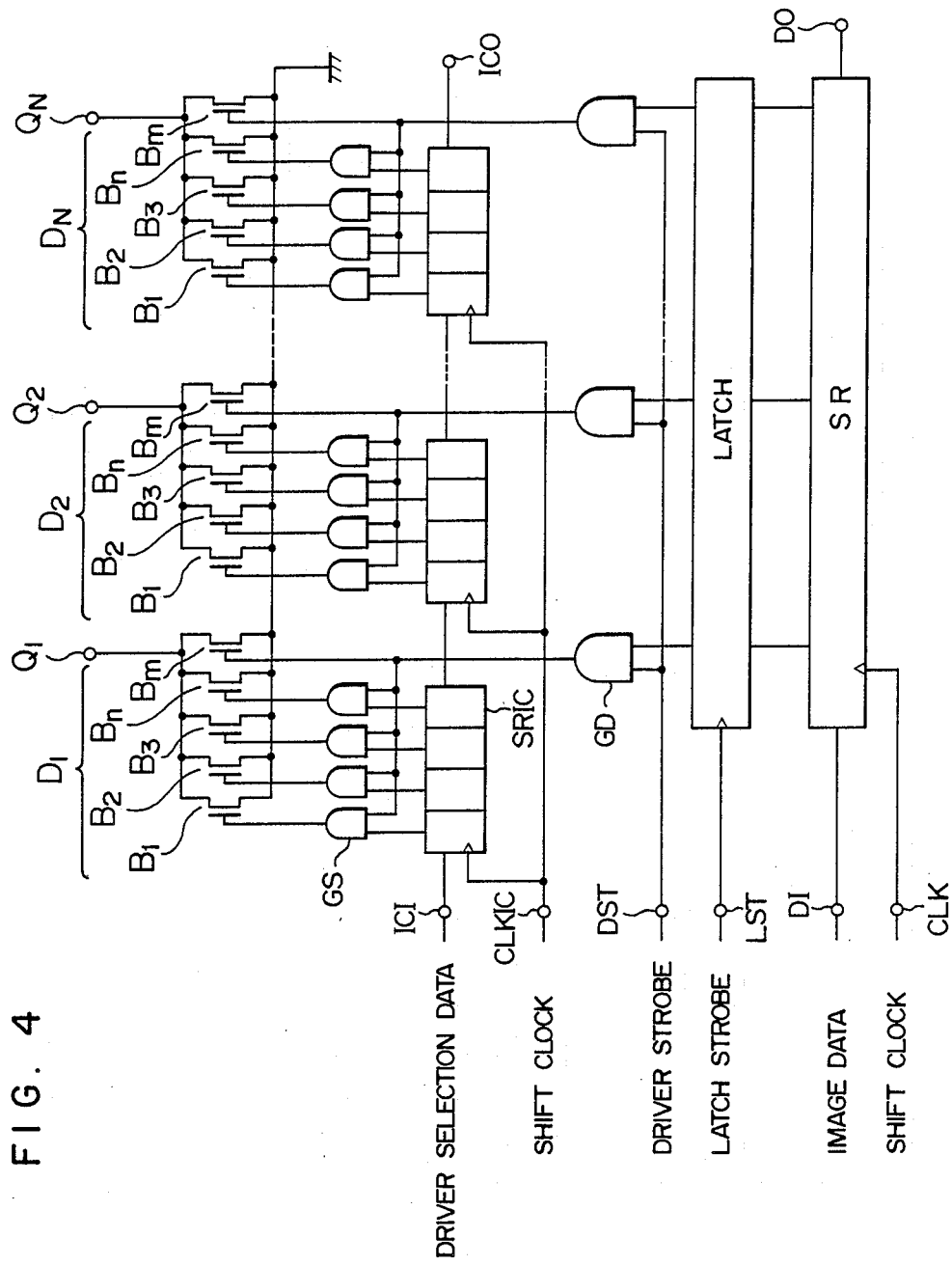

FIG. 4 illustrates a third embodiment of this invention. The difference of this embodiment from that illustrated in FIG. 3 consists in that the register for the signal controlling the selection of the divided drivers $B_1$-$B_n$ is included in each of the divided drivers $B_1$-$B_n$ in the chip. The whole register is constructed as a shift register having a data input terminal ICI, a shift clock input terminal CLK IC and a data output terminal ICO.

When the driver selection data indicating how the divided drivers $B_1$-$B_n$ should be selected are inputted successively in the shift registers SRIC for each of the outputs $Q_1$-$Q_N$, the multistage output current control described in the first embodiment can be effected for every output. Consequently, also for the drive of a light emitting diode array, where fluctuations in the light output among different elements are great, if the driver selection data are inputted, it is possible to obtain a uniform light output for all the elements by the current control. In this way an electronic photographic image formed by this embodiment has a high quality, in which no fluctuations are found even microscopically.

According to this invention, since it is possible to remove unevenness in the light output of a light emitting diode array by the multistage output current, control, and further since it is possible to easily correct changes of the light output of the light emitting diodes with the passage of time by means of re-inputting digital signals for the multistage output current control, a high quality electronic, photographic image always having a constant density can be obtained without fluctuations in the density.

What is claimed is:

1. A driving circuit for driving a light emitting diode array including at least a row of light emitting diode elements so that they emit light selectively depending on image data to be printed, comprising:
    a first register successively storing sequential image data;
    a second register temporarily holding said image data successively stored in said first register;
    m drivers associated with each of said light emitting diode elements, said drivers being driven on the basis of said image data held in said second register; and
    means for selectively adjusting output current to a light emitting diode connected to m drivers by controlling n of said m drivers in accordance with a driver selection signal, wherein m and n are integers greater than one.

2. A driving circuit according to claim 1, wherein the currents flowing through said n drivers are proportional to a minimum current, in accordance with a proportionality constant being defined by a factor of 2 to the power of increasing integers starting from 0, i.e. $2^0, 2^1, 2^2, \ldots 2^{n-1}$.

3. A driving circuit according to claim 1, wherein said means for selectively adjusting comprises input terminals receiving said driver selection signal; signal supply lines connected to said input terminals, and gates gating said driver selection signal on said input terminals and said image data and providing the gated output to said n drivers.

4. A driving circuit according to claim 3, wherein said means for selectively adjusting includes a shift register for registering said driver selection signal.

5. A driving circuit according to claim 1, wherein said means for selectively adjusting includes a register storing said driver selection signal for all said n drivers for every light emitting diode element of the light emitting diode array so as to control the current intensity for every drive output.

6. A driving circuit for driving an array of light emitting diodes, comprising:
    a shift register receiving sequential image data;
    a latch receiving and temporarily storing image data from the shift register;
    a plurality of switches each switch associated with one of the light emitting diodes and being connected between the light emitting diode and the latch for controlling the on/off state of the light emitting diodes;
    a plurality of current controllers, one current controller associated with each of said plurality of switches and controlling the amount of current flowing through the light emitting diode associated with the corresponding switch wherein each of said plurality of current controllers comprises a plurality of current varying switches; and
    a switch controller connected to each of said plurality of current controllers, selectively controlling the state of the current varying switches of each controller to vary the total current flowing through the light emitting diode associated with a current controller.

7. The driving circuit of claim 6 wherein the current flowing through each of said plurality of current varying switches is proportional to a minimum current, in accordance to a proportionality constant being defined by a factor of 2 to the power of increasing an integer starting from 0.

8. The driving circuit of claim 6 wherein each of said current varying switches has electrodes and wherein the size of the electrodes of each of the current varying switches associated with a particular light emitting diode are different from one another so that a current flowing through each switch is proportional to 2 to the power of increasing integers starting from I, $(2^1 \times I)$, $(2^2 \times I) \ldots, (2^{n-1} \times I)$.

9. The driving circuit of claim 6 wherein there are n current varying switches associated with each light emitting diode wherein n is an integer greater than one.

10. The driving circuit of claim 9 wherein the switch controller comprises an n-bit register receiving and storing a digital signal for controlling the state of the n current varying switches associated with a light emitting diode wherein n is an integer greater than one.

11. The circuit of claim 6 wherein the switch controller comprises a plurality of registers, one associated with each of the light emitting diodes and receiving a digital signal defining a state of the current varying switches associated with the associated light emitting diode.

* * * * *

UNITED STATES PATENT AND TRADEMARK OFFICE
CERTIFICATE OF CORRECTION

PATENT NO. : 4,962,375  Page 1 of 2
DATED : October 9, 1990
INVENTOR(S) : Hideo HIRANE et al.

It is certified that error appears in the above-identified patent and that said Letters Patent is hereby corrected as shown below:

| Column | Line | Corrections |
|---|---|---|
| 1 | 2 | After "ARRAY" start new paragraph. |
| 1 | 16 | After "No. 1)" insert --.--. |
| 1 | 54 | Change "this type" to --these types-- |
| 2 | 53 | Change "more in detail" to --in more detail--. |
| 3 | 21 | Change "B, $B_2$," to --$B_1$, $B_2$,--. |
| 3 | 46 | Change "$3I,-(2^n-1)I$ to --$3I,---(2^n-1)I$--. |
| 4 | 11 | Change "multi stage" to -- multi-stage --. |
| 4 | 44 | After "$B_1 - B_n$" insert --.--. |

UNITED STATES PATENT AND TRADEMARK OFFICE
CERTIFICATE OF CORRECTION

PATENT NO. : 4,962,375

DATED : October 9, 1990

INVENTOR(S) : Hideo Hirane et al.

Page 2 of 2

It is certified that error appears in the above-identified patent and that said Letters Patent is hereby corrected as shown below:

| | | |
|---|---|---|
| 5 | 8 | After "current" delete the comma. |
| 5 | 12 | Change "multistage" to -- multi-stage --. |
| 5 | 13 | After "electronic" delete the comma. |

Signed and Sealed this

Twenty-first Day of July, 1992

Attest:

DOUGLAS B. COMER

*Attesting Officer*     *Acting Commissioner of Patents and Trademarks*